United States Patent [19]

Hall

[11] Patent Number: 4,820,123
[45] Date of Patent: Apr. 11, 1989

[54] DIRT REMOVAL MEANS FOR AIR COOLED BLADES

[75] Inventor: Kenneth B. Hall, Jupiter, Fla.

[73] Assignee: United Technologies Corporation, Hartford, Conn.

[21] Appl. No.: 185,226

[22] Filed: Apr. 25, 1988

[51] Int. Cl.⁴ .................................................. F01D 5/18
[52] U.S. Cl. ........................................ 416/97 R; 416/92
[58] Field of Search ................... 416/92, 97 R, 96 R, 416/97 A

[56] References Cited

U.S. PATENT DOCUMENTS

| | | |
|---|---|---|
| 2,632,626 | 3/1953 | McClintock . |
| 3,220,697 | 11/1965 | Smuland et al. . |
| 3,356,340 | 12/1967 | Bobo . |
| 3,533,711 | 10/1970 | Kercher ........................ 416/96 R |
| 3,533,712 | 10/1970 | Kercher ........................ 416/96 R |
| 3,588,277 | 6/1971 | Howald ........................ 416/96 R |
| 3,628,885 | 12/1971 | Sidenstick et al. ............... 416/97 R |
| 3,635,586 | 1/1972 | Kent et al. ........................ 416/97 |
| 3,918,835 | 11/1975 | Yamarick et al. .................. 416/95 |
| 3,989,412 | 11/1976 | Mukherjee ........................ 416/97 |
| 4,026,659 | 5/1977 | Freeman, Jr. ....................... 415/115 |
| 4,309,147 | 1/1982 | Koster et al. ........................ 416/95 |
| 4,456,428 | 6/1984 | Cuvillier ........................ 416/97 |
| 4,474,532 | 10/1984 | Pazder ........................ 416/97 |
| 4,515,526 | 5/1985 | Levengood ........................ 416/96 |
| 4,522,562 | 6/1985 | Glowacki et al. ................... 416/95 |
| 4,529,357 | 7/1985 | Holland ........................ 416/92 |
| 4,604,031 | 8/1986 | Moss et al. ...................... 416/92 X |

FOREIGN PATENT DOCUMENTS

EP34961  9/1981  European Pat. Off. .......... 416/97 R

Primary Examiner—Everette A. Powell, Jr.
Attorney, Agent, or Firm—Norman Friedland

[57] ABSTRACT

A dirt removal means for air cooled blades for removing dirt at the blade of a gas turbine engine. The means is a stamped out sheet metal that defines a deflector or plurality of deflectors adapted to overlie the inlets of the blade's internal cooling passages for diverting the dirt entrained air through a high velocity air stream and discharging the dirt entrained air while allowing the cleaner portion of air to turn the corner of the deflector and flow through the blades cooling passages. These means can be applied to existing blades.

4 Claims, 2 Drawing Sheets

DIRT REMOVAL MEANS FOR AIR COOLED BLADES

This invention was made under a Government contract and the Government has rights herein.

CROSS REFERENCE TO RELATED APPLICATIONS

This application relates to commonly assigned, co-pending, U.S. patent application Ser. No. 185,227, filed by Kenneth B. Hall et al on even date herewith and bearing the same title as the herein invention.

TECHNICAL FIELD

This invention relates to cooled blades of a rotor of a gas turbine engine and particularly for controlling foreign matter contained in the cooling air so as to prevent clogging of the cooling air holes or passages in the blade.

BACKGROUND ART

It is well known that engine parts, particularly the blades of the turbine of aircraft gas turbine engines are cooled by use of engine cooling air. For example, cooling of the turbine blades is attained by routing cooling air from the engine's compressor through a TOBI (turbine on-board injector) which is then fed through internal passages formed within the blade. The air is ultimately discharged through openings in the turbine blades and may be returned to the engine's gas path.

Equally well known is the fact that foreign matter, either acquired through the ambient environment or self-generated within the engine, ingests into the cooling airstream and has the propensity of clogging these cooling passages and openings referred to in the above. Obviously, aircraft that is operating in areas where dust is at high levels, such as in the sandy areas of certain geographic locations of the world, the problem becomes exasperated.

Many attempts have been made to alleviate these problems and examples of such attempts are disclosed, for example, in U.S. Pat. No. 3,356,340 granted to M. Bobo on Dec. 5, 1967, U.S. Pat. No. 4,309,147 granted to W. E. Koster et al on Jan. 5, 1982, U.S. Pat. No. 2,632,626 granted to F. A. McClintock on Mar. 24, 1953 and U.S. Pat. No. 3,918,835 granted to G. J. Yamarik on Nov. 11, 1975, the latter two patents being assigned to United Technologies Corporation, the assignee of this patent application.

In each of these instances the cooling air passes through a tortuous route before reaching the turbine cooling passages so that the foreign particles in the cooling airstream are diverted from the turning cooling airstream or the cooled air entrained dirt is admitted to a centrifugal field where the heavier foreign particles are centrifuged to a surface and retained there until the engine is disassembled and cleaned. The U.S. Pat. No. 3,918,835 discloses a centrifugal type of dirt separator and provides an inclined surface that directs the collected dirt particles toward the labyrinth seal where it migrates thereto and is carried through the seal by the leakage air.

In other types of dirt separators or removal schemes, mechanisms upstream of the turbine are provided so as to prevent the dirt from reaching the turbine blades. Historically, such schemes would include a ramp mounted ahead of the TOBI. The ramp serves to deflect and prevents the dirt from making the sharp turn that is required for the cooling air to get into the TOBI. This has met with some success where the dirt particles are sufficiently large so that the inertia of the particle overcomes the velocity of the cooling airstream causing the particle to continue its travel while the air makes a turn. However, smaller sized particles would be influenced by the cooling stream velocity and would turn with the air and hence be carried into the blade cooling passages and holes. This resulted in dirt buildup in passages and clogging of holes which adversely affected the cooling ability of the cooling system. Obviously, this blockage can result in distress or failure of the airfoil or reduce the pressure of the cooling air supplied to the vane upstream of the turbine. To overcome the pressure loss it would be necessary to increase coolant outflow which, in turn, would increase the burner pressure drop and thereby adversely affect engine performance.

I have found that I can obviate the problems enumerated in the above by providing a stamped out sheet metal deflector that attaches to the root of the blade so as to direct the dirt entrained air either into a high velocity passage in the blade itself or a high velocity passage in the turbine disk or in proximity thereto, hence providing a method to make the cooled turbine blades tolerant to dirt or dust contaminating the cooling air. Inherently, such a system would eliminate the need of the upstream air cleansing schemes that have been heretofore prevalent in the gas turbine engine technology, and could be used as a "fix" to existing blades.

DISCLOSURE OF INVENTION

It is an object of the invention to judiciously dispose at the root of a multipassage gas turbine engine turbine blade a plurality of baffles extending angled at their entrance so as to divert the entrained dirt into the leading and/or trailing edge passage so that the relatively high velocity of the cooling air in these passages carry the entrained dirt out of a dirt removal hole formed at the tip of the blade, or through openings formed in the disk supporting the blade.

A further feature of this invention is to fabricate the baffles by stamping out deflectors from a sheet metal stock and sizing the sheet metal to attach to the underside of the blade.

The foregoing and other features and advantages of the present invention will become more apparent from the following description and accompanying drawings.

BEST MODE FOR CARRYING OUT THE INVENTION

For a detailed description of a cooled turbine blade for an aircraft gas turbine engine, reference should be made to U.S. Pat. No. 4,479,532, granted to M. J.

Pazder on Oct. 2, 1984, and assigned to the same assignee as this patent application.

For the sake of simplicity and convenience the detail of the blades is omitted from the drawings illustrated in FIGS. 1 through 5 and only the essential portions necessary for an understanding of the invention will be detailed. As will be understood, the internal construction of the blade may utilize any of the heat transfer enhancement schemes that are known in this technology. Hence, it is contemplated that the airfoil would incorporate the requisite trip strips, pedestals, vanes and the like to achieve the desired cooling.

Figure 1:
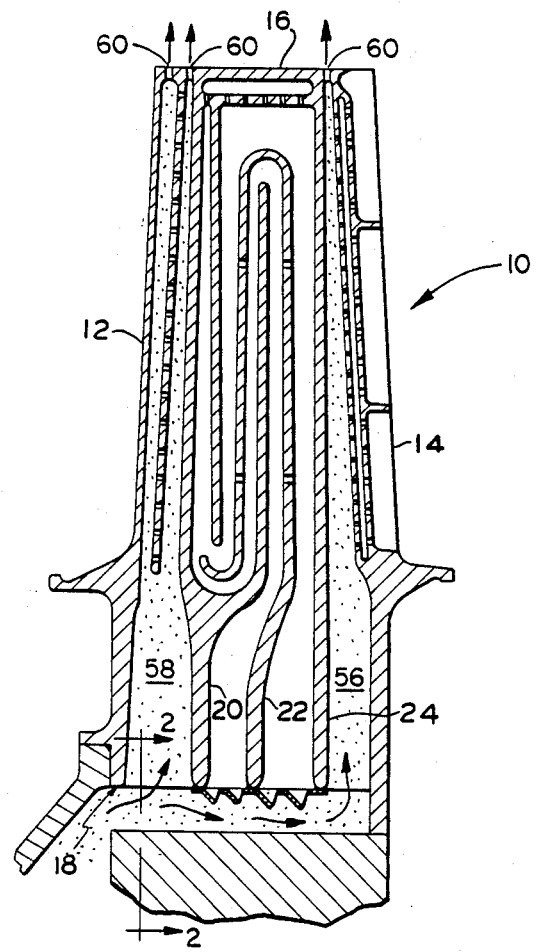
FIG. 1 is a partial view of a turbine rotor in section and partly in schematic incorporating the present invention.

FIG. 1 is illustrative of the interior of the airfoil section taking a section through the longitudinal or spanwise axis of a typical turbine air cooled blade. It is to be understood that this invention can be utilized with other types of air cooled blades and it is noteworthy that the invention is of significance because it can be applied to existing blades. The airfoil section 10 of the blade is partitioned by a plurality of ribs into a plurality of sub-passages. As noted, the blade comprises the leading edge 12, trailing edge 14, tip 16 and root end 18. Ribs 20, 22 and 24 define multi passages including passage 56 and 58 extending in the spanwise direction. As is well known each of the passages and the impingement sections are designed to accomplish well defined objectives, which are not dealt with in this patent application. The design of these high technology cooled turbine blades require a significant number of holes which also have well defined objectives.

It is apparent from the foregoing that the cooling air admitted into these passages is entrained with foreign matter, and this foreign matter more likely than not will adhere to the walls of the passages and/or clog the holes.

Figure 2:
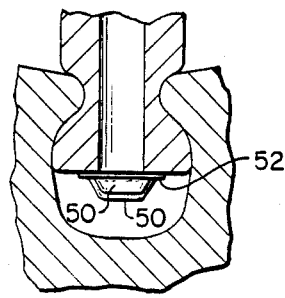
FIG. 2 is a partial view taken along the lines 2—2 of FIG. 1.
Figure 3:
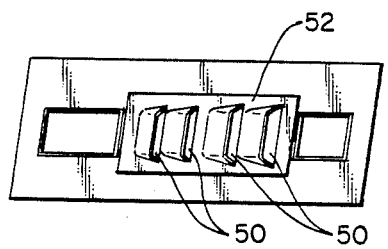
FIG. 3 is a bottom view of the blade of FIG. 1 showing the deflectors fabricated from sheet metal stock.

As can be seen in FIGS. 1, 2 and 3, the deflecting members 50 are mounted externally of the blades and serve to deflect the dirt entrained air to a specific passageway.

In accordance with this invention the deflectors 50 are stamped out of sheet metal blank 52 and then is suitably attached to the root of the blade 10 by any well-known method such as brazing, welding, etc. The deflectors 50 which are defined by raised panels extending from the leading edge to the trailing edge and are positioned to overlie the passages intended to be protected. The dimensions of these panels will be predicated on the size of the opening being protected. In this instance, the deflectors 50 deflect the dirt entrained cooling air into the trailing edge passage 56 and leading edge passage 58 and divert this contaminated air from the serpentine passages. The leading edge passage 58 and trailing edge passage 56 are formed so as to afford as little pressure losses as possible and receive air at sufficient velocity to carry the dirt to the dirt removal holes 60. The dirt free or substantially dirt free air can still get into the serpentine passages through the openings underneath the panels 50.

Figure 4:
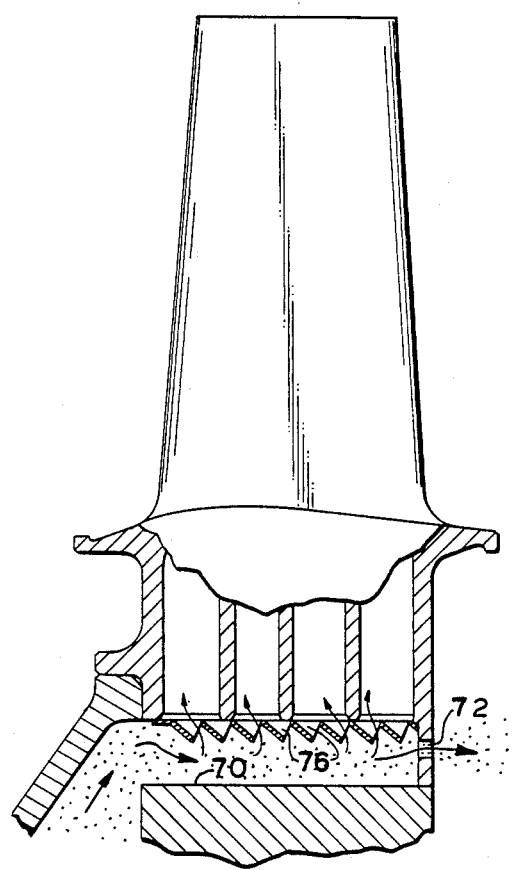
FIG. 4 is a partial view similar to FIG. 1 showing another embodiment of this invention.
Figure 5:
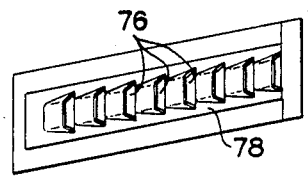
FIG. 5 is a view in elevation of the stamped out sheet metal stock forming the deflection.

FIGS. 4 and 5 are another embodiment of this invention utilizing a similar fabricated deflector where the dirt entrained air is directed to the high velocity passageway 70 and discharged away from the blade's internal passageways through apertures 72 formed in the disk 74 of the turbine rotor. Again, as was the design of FIGS. 1 to 3, the deflectors 76 are stamped out of a sheet metal stock 78 which is sized to overlie the passages at the root of the turbine blade. Also, the sheet metal plate 78 can be affixed to the blade in any suitable manner, by say brazing, welding or mechanical attaching means.

It is apparent from the foregoing that this invention can be utilized with existing internally cooled blades. Hence, such a design would be efficacious to "fix" an existing blade clogging problem.

Although this invention has been shown and described with respect to detailed embodiments thereof, it will be understood by those skilled in the art that various changes in form and detail thereof may be made without departing from the spirit and scope of the claimed invention.

I claim:

1. An internally cooled turbine blade supported in a turbine disk for a gas turbine engine, said blade having a root section mounted in a recess formed in said disk and a tip section, wall means between said root section and tip section defining an airfoil of said blade, means including an inlet internally in said blade for routing cooling air through said inlet into said airfoil and discharging through openings in said wall into the gas path of said gas turbine engine, means for preventing dirt from clogging said openings, said means including a sheet metal generally rectangularly shaped and having a portion stamped out so as to have a depending deflector portion extending angularly therefrom, means for securing said sheet metal to the root section of said blade so that said deflector portion is angularly disposed relative to said inlet and being in overlying relationship, means for admitting cooling air in said recess between said root section and said disk and an opening in said disk for discharging a portion of said air out of said disk and bypassing said inlet, whereby said deflector deflects the dirt entrained airstream into the discharging air while permitting the relatively dirt-free entrained air to enter said inlet by turning around the angle formed by said deflector.

2. An internally cooled turbine blade as in claim 1, including a plurality of internal passages in said turbine blade and a plurality of inlets associated with each internal passage, a complementary deflector stamped out of said sheet metal aligned to be angularly disposed relative to each of said plurality of inlets, and overlying said inlets to deflect said dirt entrained air into said discharging portion of said cooling airstream.

3. Means for removing dirt from an internally cooled blade for a gas turbine engine, said blade having a root section, a tip section and wall means between said tip section and root section defining an airfoil, a plurality of spanwise disposed ribs internally of said blade defining serpentine passages for conducting cool air through the blade and discharging into the engine's gas path through openings in said wall means, at least one straight through passage internally of said blade for conducting cooling air from the root section to the tip section and discharging into the gas path through an opening formed in said tip section, the opening being sized to discharge the largest dirt particle into the gas path, a sheet metal member having deflectors stamped therein to extend angularly relative to the opening remained in the sheet metal, means for attaching said sheet metal to the root section of said blade and orienting said deflectors to overlie the inlet of said serpentine passages, and direct the dirt entrained air into said straight through passages.

4. Means for removing dirt as claimed in claim 3, wherein said blade is a turbine blade.

* * * * *